Jan. 8, 1935.　　　L. R. McDONALD　　　1,987,483
GYROSCOPIC POSITION INDICATOR
Filed May 13, 1930
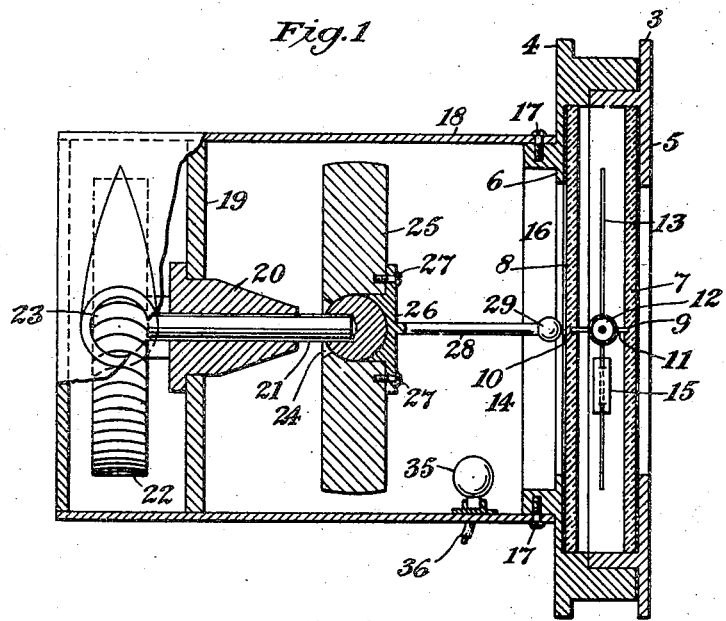
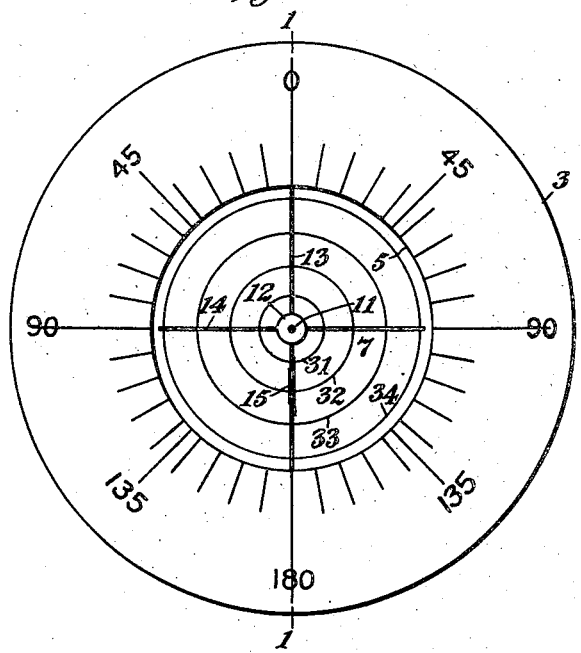
Inventor,
Leslie R. McDonald
By his Attorney Patented Jan. 8, 1935

1,987,483

UNITED STATES PATENT OFFICE 1,987,483

GYROSCOPIC POSITION INDICATOR

Leslie R. McDonald, Montreal, Quebec, Canada

Application May 13, 1930, Serial No. 451,945

4 Claims. (Cl. 33—204)

My invention relates to an improvement in means for indicating the direction and extent of the change of position of a moving body, such as an airplane; and it is particularly directed to an instrument embodying means, automatically self-adjusting to a horizontal or a vertical line, combined with means, also automatically self-adjusting, for indicating the variation of position of the moving body from the horizontal or vertical position indicated by the instrument.

The objects of my invention are to produce automatically self-adjusting means for indicating a horizontal and/or vertical position; to combine therewith means for measuring the rotational variation between the indicator carrying body and such horizontal and/or vertical indicating means; to produce an improved means for indicating a normal straight line movement of the carrying body; to combine with such last mentioned means means for indicating the direction and extent of movement of the carrying body from said normal line of movement; to combine in one instrument features embodying two or more of the objects mentioned; and to secure advantages of details of construction, all as hereinafter more fully pointed out and explained.

In the drawing Fig. 1 is a view, the right hand portion of which is a longitudinal vertical section, taken as on the line 1, 1 of Fig. 2, looking to the right, the left hand portion being partially in elevation and partially broken away to show more clearly the rotor actuating element; and Fig. 2 is a front view taken as looking to the left on Fig. 1.

The face of the instrument is composed of a housing, shown as formed of two annular elements 3, 4, between the inner flanges 5, 6 of which two glass discs 7, 8 are mounted, so as to form a tightly sealed chamber between them, and near the center of each disc 7, 8 a socket or recess, as 9, 10, is formed, in which recesses is pivoted an axle element 11, which carries a small float, indicated as a hollow sphere 12, which supports a vertically disposed indicating element 13, preferably made of a very small aluminium tube, and a horizon indicating element 14, preferably similarly constructed. And to the lower limb of the element 13 is attached a very thin damping element or vane, as 15.

The space between the glass discs 7, 8 is filled with a suitable transparent non-freezing liquid; and the parts of the horizontal and/or vertical indicating element mounted between the glass discs are so proportioned that the buoyancy of the float 12 is very nearly sufficient to support the weight of the elements mounted about the axle 11, so that there shall be very little friction between the axle and its bearings; the axially mounted elements being also so proportioned that they will normally adjust themselves to a true horizon and perpendicular under the influence of gravity. The damping vane serves to prevent the too rapid movement, about its axis, of the horizon-perpendicular indicating element, and to prevent its being jarred or joggled to and fro by ordinary tremors from the carrying body.

The housing 3, 4 carries a suitable annular flange, as 16, to which is secured, as by bolts 17, 17, a preferably cylindrical casing 18, shown as provided with a transverse or diaphragm element 19 supporting the bearing 20 in which is mounted a shaft 21 adapted to be rotated by suitable means, such as a fan 22 upon its inner end, adapted to be driven, as by a current of air directed against it, by means not shown, through an opening or neck 23 in the casing. But I wish it to be understood that this shaft 21 might be driven electrically or by any other suitable means to impart to it the desired degree of rotation. The outer end of the shaft 21 is provided with a highly polished, spherical ball 24, preferably of steel or a similar suitable material, upon which is freely seated a gyro rotor 25, held in contact with the ball by means of a retaining member, as 26, suitably secured thereto, as by screws 27, 27, so that the gyro rotor 25 is free to change its angular position upon the ball to a considerable extent, for instance 30 degrees, in either direction from the normal axis of the shaft, and independent thereof.

Secured to the gyro rotor 25 and rotating with it is a pointer 28, preferably with a spherical end 29, the normal axis of the pointer being directly in line with the axis of the shaft 21 and the axle 11, in which position the end 29 of the pointer will lie directly behind the float 12.

The face of the housing 3, 4 is provided with a suitable circular scale, preferably divided on each side of the vertical line into 180 degrees with appropriate divisions for 45 degrees and 90 degrees; and, if desired, a series of circles as 31, 32, 33 and 34 may be placed upon the face of the glass disc 7 and designated by suitable markings to indicate their degree of variation from the axis of the shaft 21.

I find it preferable to illuminate the interior of the instrument by suitable means, such as an electric light 35, mounted inside the housing and provided with suitable circuit connections, as 36.

From the above description it will be seen that if the instrument is mounted, for instance in an airplane, and the gyro rotor set in motion, under normal conditions, the pointer 28 will lie in a straight line between the shaft 21 and the axle 11, while the horizontal-perpendicular indicator will assume a true position relative to the true horizon and its perpendicular. If now the plane is caused to roll either to the right or left the degree of rotation will be indicated by the divergence of the scale on the face of the housing from the position of the arms of the horizontal-perpendicular indicator; and if the plane is pointed up, down or to either side the pointer 28 of the gyro rotor will swing toward that direction, and the extent of the deviation of direction of the plane will be indicated by the position of the head of the pointer 28 behind the glass discs 7, 8 and may be read from the circular graduations on the disc 7. Thus the instrument will plainly show the direction and extent of movement of the plane around or away from its longitudinal axis, the later deviation, of course, being measured up to the limit of adjustment of the ball 24 within the gyro rotor.

I wish it to be understood that the form of the embodiment of my invention which I have described and claim is to be regarded as a typical and not as an exclusive form; for it is obvious that details of constructions may be modified, as by the use of equivalent elements, without departing from the spirit of my invention as claimed.

Having thus described my invention, what I claim and desire to secure by Letters Patent of the United States is:—

1. In an instrument of the character described, means for indicating axial change of position, embracing means, rotatable about a fixed axis, embodying a spherical terminal, a gyro-rotor mounted on and coupled frictionally to such spherical terminal and otherwise unsupported, the axis of rotation of the rotatable means being variable from the axis of rotation of the gyro-rotor, and an indicating element on the rotor projecting along the axis of rotation thereof.

2. In an instrument of the character described, means for indicating axial change of position, embracing means, rotatable about a fixed axis, embodying a spherical terminal, a gyro-rotor provided with a socket adapted to receive the spherical element and to couple the rotor thereto in free, frictional, rotatory relation without other support, an indicating element on the rotor projecting in the line of the axis thereof, the axis of rotation of the rotatable means being variable from the axis of rotation of the gyro-rotor, and fixed, graduated means for indicating the extent of variation between the axis of rotation of the rotating means and that of the gyro-rotor by comparison with the position of the indicating element of the rotor.

3. In an instrument of the character described, means for indicating axial change of position, embracing means, rotatable above a normally horizontally disposed, fixed axis, a gyro-rotor frictionally mounted on such rotatable means, and solely supported thereby and normally rotatable in a vertical plane, the axis of rotation of the rotatable means being variable relative to the axis of rotation of the gyro-rotor, an element adapted to show the axis of rotation of the gyro-rotor, and fixed, graduated means adapted to indicate by comparison the extent of the variation between the axes of rotation of the rotatable means and the rotor.

4. In a gyroscopic position indicator the combination of means for indicating axial change of position, embracing a spherical terminal rotatable about a normally fixed axis, a gyro-rotor frictionally mounted on such spherical terminal, solely supported thereby, and normally rotatable therewith, the axis of rotation of the spherical terminal being freely variable relative to the axis of rotation of the gyro-rotor, an indicating element carried by and extending along the axis of rotation of the gyro-rotor, and fixed, transparent, graduated means in front of the indicating element and adapted to show by comparison therewith the extent of the variation between the axes of rotation of the rotatable means and the rotor.

LESLIE R. McDONALD.